(12) United States Patent
Freda et al.

(10) Patent No.: US 12,127,044 B2
(45) Date of Patent: *Oct. 22, 2024

(54) METHODS FOR RESOURCE RESERVATION TO SATISFY NEW RADIO (NR) VEHICULAR COMMUNICATIONS (V2X) QUALITY OF SERVICE (QOS) REQUIREMENTS

(71) Applicant: InterDigital Patent Holdings, Inc., Wilmington, DE (US)

(72) Inventors: Martino Freda, Laval (CA); Tuong Hoang, Montreal (CA); Tao Deng, Roslyn, NY (US); Aata El Hamss, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,468

(22) Filed: Jul. 27, 2023

(65) Prior Publication Data
US 2023/0370903 A1 Nov. 16, 2023

Related U.S. Application Data

(63) Continuation of application No. 17/265,956, filed as application No. PCT/US2019/044626 on Aug. 1, 2019, now Pat. No. 11,758,439.

(Continued)

(51) Int. Cl.
*H04W 28/26* (2009.01)
*H04W 28/02* (2009.01)
*H04W 92/18* (2009.01)

(52) U.S. Cl.
CPC ....... *H04W 28/26* (2013.01); *H04W 28/0268* (2013.01); *H04W 28/0289* (2013.01); *H04W 92/18* (2013.01)

(58) Field of Classification Search
CPC ............ H04W 28/26; H04W 28/0268; H04W 28/0289; H04W 92/18
See application file for complete search history.

(56) References Cited

U.S. PATENT DOCUMENTS

2016/0295624 A1* 10/2016 Novlan ................. H04L 67/12
2018/0139593 A1  5/2018 Chun et al.
(Continued)

FOREIGN PATENT DOCUMENTS

| CN | 107889073 A | 4/2018 |
|---|---|---|
| EP | 3273634 A1 | 1/2018 |
| EP | 3501220 B1 | 8/2023 |

OTHER PUBLICATIONS

3GPP Tdoc R2-166643, 3GPP TSG RAN WG2 Meeting #95bis, Kaohsiung, Taiwan, Oct. 10-14, 2016, 3 pages.
(Continued)

*Primary Examiner* — Ajay Cattungal
(74) *Attorney, Agent, or Firm* — Flaster Greenberg P.C.

(57) ABSTRACT

Methods, apparatus, systems, architectures and interfaces for determining whether sidelink resources of a sidelink radio bearer are available, and for reserving resources of any number of sidelink radio bearers for transmission of periodic data are provided. The method includes determining any of a size, a period, or a pattern of a resource reservation for periodic data that is to be transmitted by the WTRU via the sidelink radio bearer; determining sidelink resources available for transmission of the periodic data via any number of sidelink radio bearers; and transmitting a message including the resource reservation including information indicating reservation of the available sidelink resources for transmission of the periodic data by the WTRU according to any of the size, the period, or the pattern of a resource reservation, (Continued)

wherein the message includes any of a bearer identifier (ID) or Quality of Service (QoS) information.

20 Claims, 8 Drawing Sheets

Related U.S. Application Data

(60) Provisional application No. 62/752,665, filed on Oct. 30, 2018, provisional application No. 62/715,569, filed on Aug. 7, 2018.

(56) References Cited

U.S. PATENT DOCUMENTS

| | | | | |
|---|---|---|---|---|
| 2019/0124015 | A1* | 4/2019 | Loehr | H04L 5/0058 |
| 2019/0380056 | A1* | 12/2019 | Lee | H04B 7/0695 |
| 2020/0344674 | A1* | 10/2020 | Ishii | H04W 48/14 |
| 2020/0359257 | A1* | 11/2020 | Kim | H04W 28/0289 |
| 2021/0212124 | A1* | 7/2021 | Wakabayashi | G01S 5/0236 |
| 2021/0329596 | A1* | 10/2021 | Freda | H04W 72/542 |
| 2021/0385694 | A1* | 12/2021 | Freda | H04W 28/0289 |

OTHER PUBLICATIONS

3rd Generation Partnership Project (3GPP), "Technical Specification Group Services and System Aspects; Enhancement of 3GPP support for V2X scenarios; Stage 1 (Release 15)", 3GPP TS 22.186 V15.2.0, Sep. 2017, 16 pages.

3rd Generation Partnership Project (3GPP), "Technical Specification Group Radio Access Network; Evolved Universal Terrestrial Radio Access (E-UTRA); Physical layer procedures (Release 14)", 3GPP TS 36.213 V14.4.0, Sep. 2017, 462 pages.

3rd Generation Partnership Project (3GPP), 3rd Generation Partnership Project; Technical Specification Group Services and System Aspects; "Study on enhancement of 3GPP Support for 5G V2X Services (Release 15)", TR 22.886 V15.3.0, Sep. 2018, 58 pages.

* cited by examiner

METHODS FOR RESOURCE RESERVATION TO SATISFY NEW RADIO (NR) VEHICULAR COMMUNICATIONS (V2X) QUALITY OF SERVICE (QOS) REQUIREMENTS

CROSS-REFERENCE TO RELATED APPLICATIONS

This application is a continuation of U.S. patent application Ser. No. 17/265,956, filed Feb. 4, 2021, which is the National Stage entry under 35 U.S.C. § 371 of Patent Cooperation Treaty Application No. PCT/US2019/044626, filed Aug. 1, 2019, which claims the benefit of U.S. Provisional Patent Application No. 62/752,665, filed on Oct. 30, 2018, and U.S. Provisional Patent Application No. 62/715,569, filed Aug. 7, 2018, the contents of which being hereby incorporated by reference as if fully set-forth herein in their respective entireties, for all purposes.

BACKGROUND

The present invention relates to the field of communications and, more particularly, to methods, apparatus, systems, architectures and interfaces for communications in an advanced or next generation wireless communication system, including communications carried out using a new radio and/or new radio (NR) access technology and vehicular communications (V2X).

The design of the next generation of wireless systems is currently underway in the academia, industry, regulatory and standardization bodies. The IMT-2020 Vision sets the framework and overall objectives for the development of the next generation of wireless systems. To address an anticipated increase in wireless data traffic, demand for higher data rates, low latency and massive connectivity, the IMT-2020 Vision defines the main use cases that drive fifth generation (5G) design requirements: enhanced mobile broadband (eMBB), ultra-reliable low latency communications (URLLC), and massive machine type communications (mMTC). These use cases have widely different targets on peak data rates, latency, spectrum efficiency, and mobility.

Although the IMT-2020 Vision indicates not all of the key capabilities are equally important for a given use case, it is important to build flexibility in the 5G designs, to enable meeting expected use-case specific requirements and support multiple services. In this regard, 3rd Generation Partnership Project (3GPP) is conducting research and development for a new radio and/or new radio access technology (collectively referred to as "NR") for the advanced or next generation (e.g., 5G) wireless communication system in consideration of the main use cases and a variety of other/different applications along with their various needs and deployment scenarios and attendant (e.g., mandated specific) performance requirements thereof.

There are several deployment scenarios, including indoor hotspot, dense urban, rural, urban macro, high speed, etc., that 3GPP has discussed and/or defined for standards. Also, several use cases are defined, for example Enhanced Mobile Broadband (eMBB), Massive Machine Type Communications (mMTC) and Ultra Reliable and Low Latency Communications (URLLC). Different use cases may focus on different requirements, such as higher data rate, higher spectrum efficiency, low power and higher energy efficiency, lower latency and higher reliability, etc. Communications in these different use cases may involve determining a Transport Block Size (TBS). For example, for Long Term Evolution (LTE) deployment, a modulation and coding scheme (MCS) table may contains a MCS index and a corresponding modulation order and a TBS index. The TBS index, together with the number of Physical Resource Blocks (PRBs), may be used to determine the transport block size from a TBS table in a LTE deployment.

In a case of vehicular communication, for example communication between any of automobiles, infrastructure, pedestrians, and/or networks, on a roadway, wireless transmit/receive units (WTRUs) may (e.g., directly) communicate with each other. Vehicular communication scenarios may include: (1) an in-coverage scenario, wherein a WTRU may receive assistance from a network in order to start transmitting and receiving vehicular communication messages; and (2) an out-of-coverage scenario, wherein a WTRU may use pre-configured parameters to start transmitting and receiving vehicular communication messages.

Vehicular communication, which may also be referred to as V2X, is supported in Release 14 (Rel-14) Long Term Evolution (LTE), and was based on previous work done for Device-to-Device (D2D) communications. Vehicular communication services include: (1) Vehicle to Vehicle (V2V): vehicular WTRUs may communicate directly with each other; (2) Vehicle to infrastructure (V2I): vehicular WTRUs may communicate with any of road-side units (RSUs) or base stations (BSs), such as enhance Node-Bs (eNBs) or other access points; (3) Vehicle to Network (V2N): vehicular WTRUs may communicate with a core network; and (4) Vehicle to Pedestrian (V2P): vehicular WTRUs may communicate with UEs associated with pedestrians under certain and/or special conditions, e.g. low battery capacity.

V2X for LTE includes two modes of operation (e.g., Rel-14), namely, modes 3 and 4. In the case of mode 3, a network may give a WTRU a scheduling assignment for vehicular communication including a sidelink transmission. In the case of mode 4, the WTRU may autonomously select resources from a configured and/or pre-configured resource pool. Furthermore, V2X for LTE includes two categories of resource pools: (1) receiving pools, which may be monitored for receiving V2X transmission, and V2X transmitting pools, which may be used by WTRUs to select transmission resource(s) in mode 4. WTRUs configured to operate in mode 3 may not use transmitting pools.

In the case of V2X for LTE, resource pools (e.g., information indicating and/or associated with resource pools) may be semi-statically signaled to WTRUs via radio resource control (RRC) signaling. In the case of mode 4, a WTRU may use (e.g., may perform) sensing before selecting a resource from the RRC configured transmitting pool. However, V2X for LTE does not support dynamic resource pool reconfiguration, and pool configuration may only be performed using a SIB and/or dedicated RRC signaling.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
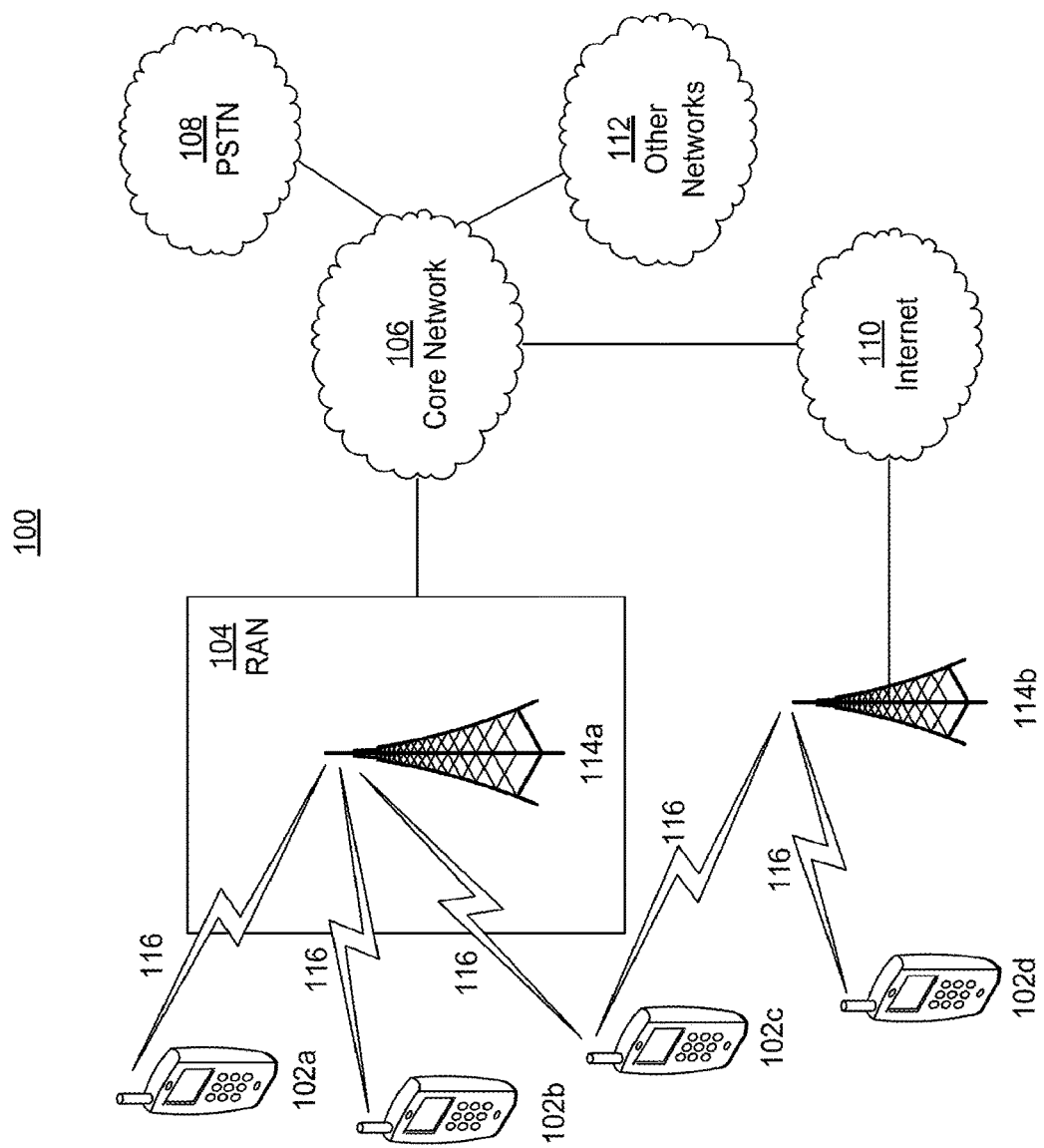
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
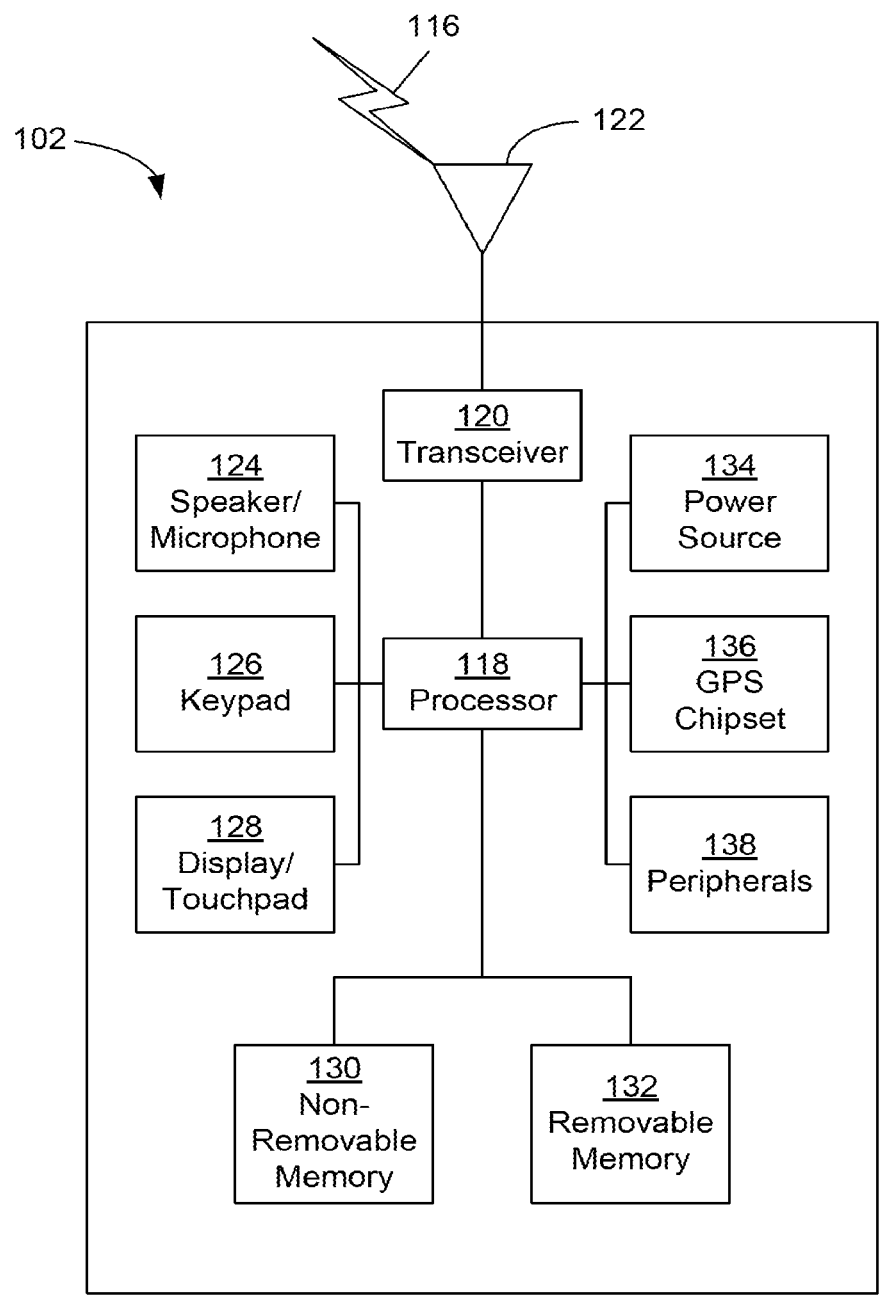
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
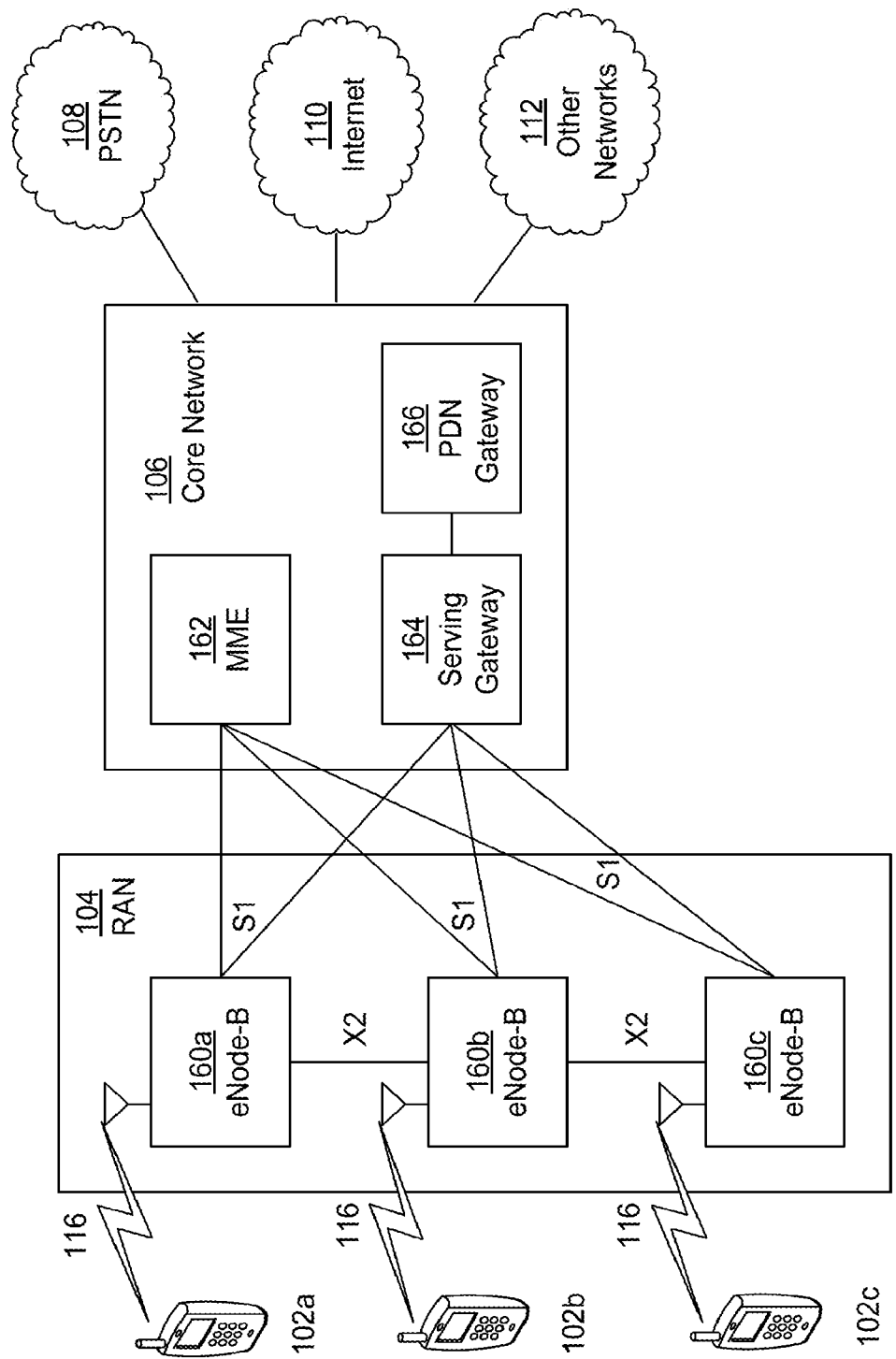
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
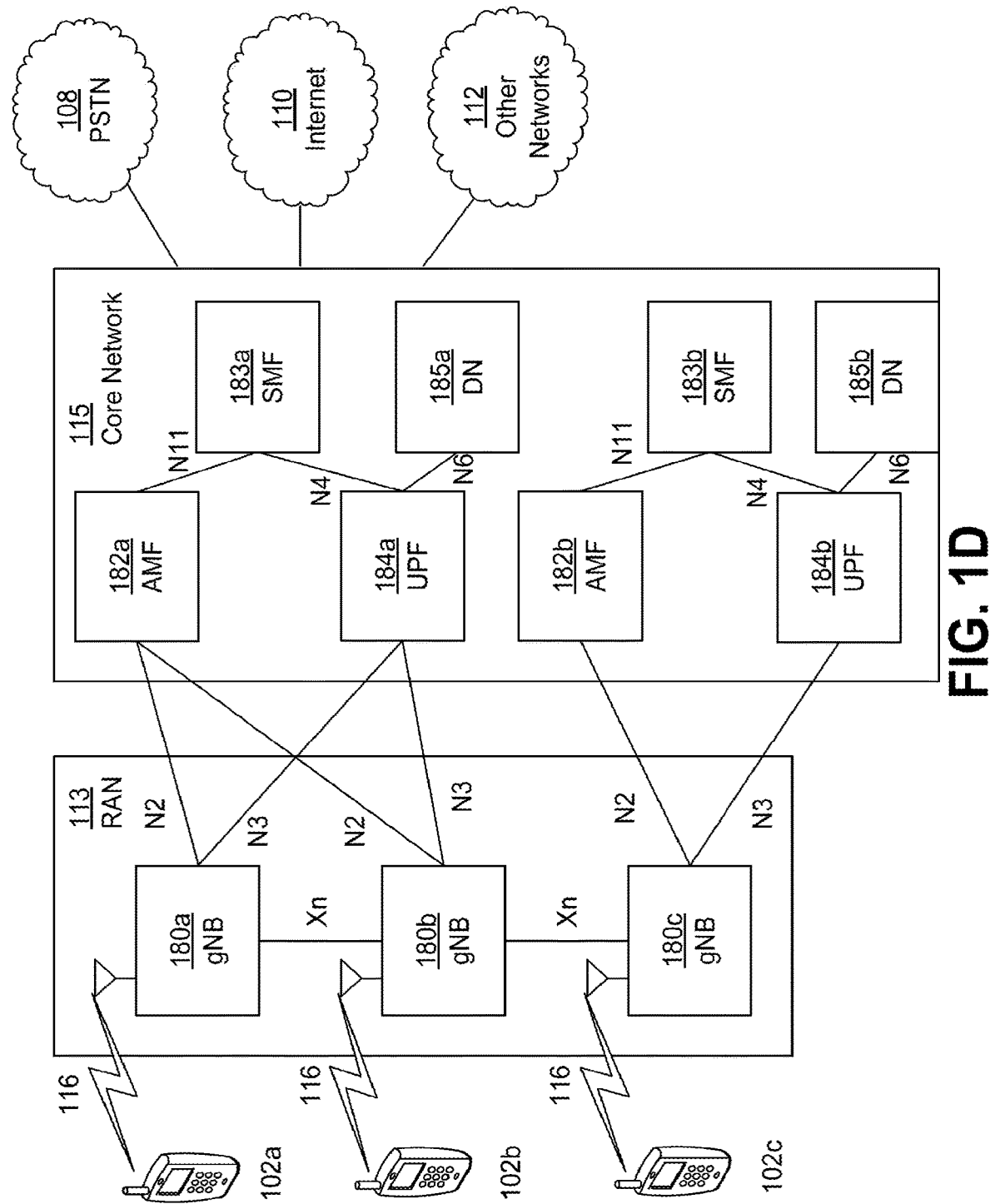
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

In the case of NR, a number of use cases, such as enhanced Mobile Broadband (eMBB), ultra-high reliability and low latency communications (URLLC), may be supported as discussed above. Further, enhanced V2X (eV2X) communication may be supported in NR systems.NR systems including eV2X may provide services for any of safety scenarios or non-safety scenarios, including services such as sensor sharing, automated driving, vehicle platooning, and remote driving. Different eV2X services may need different performance requirements. For example, a latency of 3 ms may be required.

NR vehicular communication (NR V2X) may support new use cases, including:

(1) Vehicles Platooning, which enables vehicles (and associated WTRUs) to dynamically form a group travelling together. In the vehicle platooning case, (e.g., all) vehicles in a platoon may receive data (such as periodic data and/or high-priority data) from a leading vehicle. For example, periodic data may be received by all vehicles in a platoon in order to perform platoon operations. Such periodic data may include information used to decrease the distance between vehicles. For example, the distance may be extremely small, such that a gap distance translated to time may be very low (e.g., sub-second). Furthermore, in the case of platooning vehicles, a leading vehicle may be followed by autonomously driven vehicles;

(2) Advanced Driving, which enables any of semi-automated or fully-automated driving. In the case of advanced driving, longer inter-vehicle distance may be assumed. Any of a vehicle or RSU (e.g., each vehicle and/or each RSU) may share data obtained from its local sensors with proximate vehicles. In such a case, vehicles may coordinate trajectories, maneuvers, etc., in view of the shared data. Further, each vehicle may share its driving intention with proximate vehicles;

(3) Extended Sensors, which enables exchange of any of raw or processed data. For example, exchanged data may include data gathered via (or by) any of: local sensors, live video data among vehicles, RSUs, devices of pedestrians, or V2X application servers. In the case of Extended Sensors, vehicles may improve perception of their environment, for example, beyond what their own sensors may detect; and (4) Remote Driving, which enables any of a remote driver or a V2X application to operate any of: (1) a remote vehicle for passengers who may not (e.g., cannot) drive themselves, or (2) a remote vehicle located in a dangerous environment. Further, in a case where variation is limited and routes are predictable, such as the case of public transportation, driving based on cloud computing may be used according to the Remote Driving use case. In addition, access to cloud-based back-end service platform may be considered for this use case group.

Resource Selection and/or Reservation

In the case of mode 4 in LTE V2X communications, resource selection may be based on sensing results. A WTRU may check (e.g., may determine) sensing results over a period of time. For example, upon triggering any of a resource selection or resource reselection procedure, a WTRU may check sensing results over the last one second, which is the period of time represented by subframes [n−1000, n], where n is the instant of time in which a resource selection was triggered. The sensing results may include any of all detected SCI transmissions in the last one second.

A WTRU may determine available resources in a time period [n+T1, n+T2]. For example, the WTRU may determine the available resources in such time period after determining the sensing results over the last one second. For the time period [n+T1, n+T2], T1 may be determined by the WTRU (e.g., by WTRU implementation). T2 may represent a set of selectable resources and T2 may be determined based on latency requirements of data to be transmitted. For example, there may be a case were, T2 must satisfy T2 min<T2<100, wherein T2 min is configured by a network, and T2 is such that it satisfies latency requirements of a packet received from upper layers.

In the case of LTE V2X, resource availability may be determined according to a prose per-packet priority (PPPP). For example, a WTRU may determine resource availability by comparing a PPPP associated with data to be transmitted to a PPPP associated with other WTRU transmissions, such as those transmitted in the last one second. A WTRU may be configured with a set of physical sidelink control channel (PSCCH) reference signal received power (RSRP) thresholds for each combination of any of transmitted PPPP or received PPPP. There may be a case where sidelink (SL) control information (SCI) transmitted by another WTRU reserves resources in a time period (e.g., window) [n+T1, n+T2], or any subsequent window depending on the UEs own period of transmission. In such a case, if the measured RSRP of the SCI transmitted by the other WTRU is above any of: (1) a threshold configured for the PPPP to be transmitted or (2) the PPPP contained in the received SCI, a WTRU may consider such resources to be occupied.

A WTRU may determine whether the amount of available resources exceeds a threshold. For example, before performing resource selection, a WTRU may determines whether an amount of available resources is above 20% of the resources included in a selectable time window. When the available resources exceed a threshold, the WTRU may perform random selection resources from among the 20% of resources having the lowest received signal strength indicator (RSSI). In a case where the available resources do not exceed a threshold, the WTRU may repeat determination of available resources while decreasing each of the NW configured RSRP thresholds by 3 dB.

In the case of LTE V2X SCI may indicate the subchannels for transmission by a WTRU. A WTRU operating according to mode 4 for LTE V2X may reserve future resources for periodic transmissions by indicating, in the SCI, that the WTRU is reserving the same resources used for the current transmission for the next period (and may also indicate reservation of the associated (time) period of transmission). In the case of LTE V2X, a WTRU may only be aware of a transmitting WTRU's intentions to reserve the resources for its next reservation period, and may not be aware of the transmitting WTRU's intentions to reserve several more subsequent reservation periods. For LTE V2X, in the case of resource selection associated with periodic traffic, a WTRU may randomly select a number of periods in which it will maintain/reserve resources. A WTRU may set a resource reservation flag in the SCI with each of its transmissions for a number of times equal to the randomly selected number of periods. In such a case, once the number of successive transmissions on the same resources has expired, a WTRU may further determine whether to keep or reselect new resources, and such decision may be randomly performed by the UE.

In the case of LTE V2X, PC5 quality of service (QoS) may be managed according to parameters including PPPP and prose per packet reliability (PPPR). A WTRU performing LTE V2X may receive any of a PPPP or a PPPR associated with a packet from upper layers. The PPPP may be used for prioritization in logical channel prioritization (LCP). WTRUs may prioritize data according to a PPPP. For example, WTRUs may prioritize data having a lower PPPP when selecting data to be transmitted in a sidelink grant. A PPPP may be implicitly provided to a base station (e.g., gNB, eNB, RSU, etc.) using a LCG. In the case of implicitly providing the PPPP, a base station may prioritize mode 3 transmissions between different WTRUs based on the PPPP. A WTRU may be configured with a PPPR threshold by a network. A WTRU may use a PPPR when determining whether to duplicate a transmission over two separate carriers. For example, in a case where a packet is received with a PPPR below a threshold (e.g., the packed has higher reliability requirements), the WTRU may transmit the same packet on two different carriers.

In the case of NR V2X, QoS requirements may be different from that of LTE V2X, and the parameters PPPP and/or PPPR may not satisfy requirements and/or needs for NR networks. For example, in the case of NR V2X, there may be more QoS parameters, as compared to LTE V2X, for consideration with respect to eV2X services. Further, in the case of NR V2X, there may be new key performance indicators (KPIs) for any of the following parameters: (1) payload (e.g., bytes); (2) transmission rate (e.g., message/sec); (3) maximum end-to-end latency (e.g., ms); (4) reliability (e.g., percentage); (5) data rate (e.g., Mbps); and (6) minimum required communication range (e.g., meters).

A same set of service requirements may apply to both PC5 based V2X communication and Uu based V2X communication. In the case of NR V2X, a unified QoS model for PC5 and Uu may use 5QIs for V2X communication over PC5. In such a case, the application layer may have a consistent way of indicating QoS requirements, for example, regardless of the link used. In the case of NR V2X (or in other words, 5G V2X) capable WTRUs, there are three different types of traffic: broadcast, multicast, and unicast.

In the case of unicast and multicast types of traffic, a same QoS Model as that of Uu may be used. For example, each unicast link may be treated as a bearer, and QoS flows may be associated with it. In the case of unicast and multicast types of traffic, all the QoS characteristics defined in 5QI, and additionally, a parameter of data rate, may apply. Further, a minimum required communication range may be treated as a parameter (e.g., only, specifically) for PC5 use. In the case of broadcast traffic, NR V2X may not use a bearer concept. In such a case, a 5QI may be used in a manner that of using a PPPP/PPPR. For example, a 5QI (or information associated with a 5QI) may be included or tagged with each of packet. Furthermore, a new set of 5QI, which may be referred to as any of a PC5 5QI (PQI), a PC5 QoS Flow ID (PFI), or a PQI/PFI, may be defined (e.g., specifically) for NR V2X.

Resource reservation procedures performed by a WTRU may be based on selection, by the WTRU, of a random number of reservation periods, and for each reserved period, indicating via SCI whether the same resources will be maintained for an additional period. LTE V2X is based on broadcast transmissions, and the QoS requirements are limited to using the PPPP and PPPR. However, as discussed above, NR QoS requirements may be more detailed and broad, and may not be represented by PPPP and/or PPPR. Further, NR may support any of unicast or multicast transmissions, wherein a QoS model may be based on NR Uu QoS (e.g., may be flow-based QoS). A QoS mode for NR and new NR requirements on QoS create a number of problems related to how resource reservation for periodic transmissions may be performed by a WTRU. For example, in the case of NR, there may be a problem of how a WTRU reserves resources, for example, for mode 4 transmissions, under conditions associated with periodic data.

Providing flow-based QoS over a sidelink to support unicast and multicast transmissions may include (e.g., may require) providing (e.g., the creation of) sidelink radio bearers. Similar to creation of traditional or legacy radio bearers, the creation of sidelink radio bearers may include (e.g., may require) setup mechanisms which reserve resources for the bearer (e.g. performing admission control). In the case of not reserving resources for the bearer, excessive signaling for re-configuration of the bearers may occur (e.g., may be required) when resources cannot be guaranteed, for example, due to the selection of resources by higher priority WTRUE. In view of providing flow-based QoS over a sidelink, resource reservation procedures for mode 4-like sidelink operations may be needed (e.g., may be required) to support sidelink radio bearer creation for unicast and multicast vehicular communication.

In the case of LTE V2X, message payload size requirements for periodic data range from 50 bytes to 300 bytes. With such small variations in the message payload size requirements, a resource reservation scheme using a static set of resources (e.g., which may be maintained by a WTRU based on its own decision) was sufficient for mode 4 resource reservation. In the case of NR V2X, message payload size requirements for periodic transmissions may range from 50 bytes to 6500 bytes. In the case of large variations in the message payload size requirements, reserving resources based on a maximum payload size, and/or using the reservation procedure in LTE V2X, may be inefficient for NR V2X.

NR V2X QoS mode imposes new data rate requirements (in Mbps) which did not exist in LTE V2X. To satisfy such differing rate requirements, a WTRU may need to have access to (e.g., may need to select from) an appropriate amount (e.g., differing amounts) of resources to perform resource selection. Further, in or to provide fair resource reservation between mode 4 WTRUs having different rate requirements, such requirements may be used (e.g., may need to be accounted for) in a resource reservation procedure, which was not the case in LTE V2X. In view of the above, there is a need for new reservation procedure operations.

Reservation for Long Term Usage of Resources

According to embodiments, a WTRU may perform indefinite resource reservation. For example, a WTRU may perform indefinite resource reservation upon establishment of a sidelink bearer, and for example, resources for any number of sidelink bearers may be reserved for an indefinite amount of time. According to embodiments, a WTRU may reserve resources for a sidelink transmission associated with any number of sidelink radio bearers. Such resources may be used by the WTRU for autonomous resource reservation (e.g., may be reserved autonomously by the WTRU, a mode 4-like operation). According to embodiments, a WTRU may indicate reservation of such resources for any of a finite period of time or until an occurrence of an event.

According to embodiments, there may be any of conditions and/or events associated with reserving periodic resources. According to embodiments, a WTRU may perform reservation of periodic sidelink resources for transmission. According to embodiments, a WTRU may reserve periodic sidelink resources according to any of the following conditions: (1) determination by the WTRU to initiate a sidelink radio bearer to be used for any of unicast or multicast transmission; (2) a WTRU creates a new logical channel for (e.g., allowing) reservation of resources; (3) an indication from upper layers that a WTRU may initiate a unicast or multicast transmission; (4) a WTRU determines arrival of data having periodic properties at a WTRU's buffers; (5) an amount of data at a WTRU's buffers (e.g., data potentially in a specific logical channel) is determined to any of: (a) increased by a certain amount, or (b) above a threshold; (6) a PQI/PFI is associated with a sidelink radio bearer to be set up; and (7) determination, by the WTRU, that any number of sidelink radio bearers (SLRBs) have a minimum communication range (MCR) which is larger than a distance between the WTRU and another WTRU.

According to embodiments, a WTRU may reserve periodic sidelink resources according to measurements performed by the WTRU indicating certain conditions. For example, a WTRU may reserve periodic resources when measurements of any of a carrier, a bandwidth part (BWP), a channel, indicate any of the following conditions: (i) a measured channel busy ratio (CBR) is below a threshold; (ii) a measured CR (channel occupancy ratio) for a WTRU is below a threshold; or (iii) a percentage of available resources (e.g., determined by sensing) is greater than an amount (e.g., for one or more predefined or configured periods of time).

According to embodiments, a WTRU may reserve periodic sidelink resources according to determination of a number of any of existing sidelink bearers, logical channels, or similar, established by other WTRUs for which sensing results are available, and potentially their QoS properties. For example, a WTRU may determine the number of established sidelink radio bearers by examining SCI transmissions for a period of time. According to embodiments, in a case where a number of any of established radio bearers or resources reserved for these radio bearers exceeds an amount, a WTRU may not perform resource reservation. According to embodiments, a WTRU may determine whether it may perform resource reservation based on any of the relative priorities of existing established radio bearers or the priority of the radio bearer to be established.

According to embodiments, a WTRU may determine whether resources for a radio bearer may be reserved. For example, a WTRU may determine whether resources for a certain, specific, pre-determined, etc., radio bearer are available. According to embodiments, a WTRU may notify a lower layer to perform a resource reservation procedure, for example, to establish one or multiple radio bearers. A WTRU may determine a result of the resource reservation procedure (e.g. whether resource reservation is successful) based on any of the following: (1) bearer IDs, which may indicate the QoS requirements of the radio bearers such as data rate, latency, reliability, and range; (2) a measured CBR for any of: a resource pool, a carrier, a BWP, or a subset of resources for which the WTRU may be configured to perform measurement for a radio bearer; (3) a measured channel occupancy ratio (CR) of the WTRU, (4) time and transmission opportunities a WTRU may have (e.g., may be available to the WTRU) for any number of radio bearers; (5) a transmission type of data associated with a radio bearer, which may include types such as slot-based and symbol based transmission types; and (6) a QoS parameter associated with a bearer, such as any of a PQI/PFI or set of PQI/PFI.

According to embodiments, a WTRU may be configured with a range of any of CBR or CR requirements for establishing a radio bearer. According to embodiments, a WTRU may sequentially perform resource reservation for each radio bearer in a descending order of QoS requirements. For example, a WTRU may first perform resource reservation for a radio bearer having the highest QoS requirements. After reservation for each radio bearer, a WTRU may determine a CR requirement in order to determine whether it is possible to establish another radio bearer. According to embodiments, a WTRU may consider (e.g., determine) a resource reservation for a radio bearer that does not satisfy a CR requirement to be a failure. According to embodiments, a WTRU may perform resource reservation for a whole radio bearer, and may further (e.g., gradually, at a later time, etc.) eliminate a radio bearer if it does not satisfy the CR's requirement.

According to embodiments, a WTRU may perform actions upon failure to reserve resources. For example, a WTRU may inform upper layers of an inability (e.g., a failure) to reserve resources. According to embodiments, in the case of informing upper layers of a failure to reserve resources, a WTRU may perform any of the following actions: (1) a WTRU UE may change any of a BWP or a carrier associated with transmission. For example, a WTRU may start operation on a BWP (or carrier, etc.) with a larger number of available subchannels or may change operation to any of a BWP or a carrier with a lower CBR; (2) a WTRU may change a resource pool associated with transmission; (3) a WTRU may retry resource reservation, for example, after some period of time; (4) a WTRU may indicate, for example, to upper layers, any of the following failures: to establish a radio bearer, to add a flow, or to initiate a service; and (5) a WTRU may indicate the amount (e.g., the lower amount) of resources that may be reserved, for example, to the upper layers.

According to embodiments, a WTRU may receive an indication to initiate a radio bearer for unicast or multicast transmission. For example, a WTRU may receive an indication to initiate a radio bearer for multicast transmission from higher layers. According to embodiments, an amount of resources to be reserved may be sent along with an indication to initiate a radio bearer. According to embodiments, an amount of resources to be reserved may be: (1) determined by a WTRU based on QoS requirements associated with a bearer to be set-up; and (2) derived from a PQI/PFI. According to embodiments, a WTRU may determine whether the resources can be reserved based on comparing an amount of resources to be reserved with a current channel CBR. In a case where the resources cannot be reserved, upper layers may be informed of a failure to establish a radio bearer.

According to embodiments, SCI may be used for reservation of any of multiple or indefinite resources. According to embodiments, a WTRU may transmit SCI for reserving resources indefinitely or for multiple periods. For example, a WTRU may transmit an SCI that reserves resources until further transmission of an SCI cancelling such resource reservation. According to embodiments, a WTRU may transmit SCI periodically. For example, a WTRU may transmit SCI every second. According to embodiments, a period for SCI transmission may be configured and may be unrelated to a period for data transmission. According to embodiments, periodic transmission of an SCI reserving data indefinitely may allow for such SCI to be received (e.g., may be necessary for ensuring it is received) by WTRUs performing periodic sensing according to a finite-sized sensing window.

According to embodiments, a WTRU may transmit a periodic resource reservation signal to reserve resources. For example, a WTRU may transmit a periodic resource reservation signal to reserve resources for transmission of any of: (1) PSSCH (i.e. data for the unicast/multicast link); (2) PSCCH (i.e. control information—SCI—related to the data transmitted in PSSCH); (3) physical sidelink feedback channel (PSFCH) resources (e.g., for HARQ feedback transmissions by the said UE or by the peer UE(s); (4) CSI or other reference signals required for unicast/multicast link; and (5) CSI or other feedback by the said UE or peer UE(s).

According to embodiments, any of conditions or timing for transmission of an SCI reserving resources for indefinite or multiple periods may be configured (e.g., by a network). For example, a WTRU may be configured as to whether and/or when it can transmit such SCI for indefinite or multiple periods. According to embodiments, a WTRU may only be permitted to transmit SCI reserving resources for any of indefinite or multiple periods on condition that any of: one or multiple unicast or multicast links have been established, established sidelink radio bearers have a certain QoS, and the CBR/CR is below a threshold.

According to embodiments, an SCI for reservation of any of multiple or indefinite resources may contain any of the following information: (1) any of: a bearer ID, a logical channel ID, a QoS flow ID, or similar; (2) any of: time, frequency, or beam resources to be reserved; (3) a periodicity of resources; (4) a granularity of resources (e.g. slot-based or symbol-based); (5) an index (e.g., an indicator, an identifier, etc.) referring to (e.g., identifying) a pattern of resources (e.g., a predefined and/or configured pattern); (6) QoS-related properties associated with resources; and (7) conditions by which a UE autonomously assume such resources will be available (no longer reserved).

According to embodiments, a pattern of resources (e.g., referred to by an index) may define aspects related to any of: (1) periodicity of resources in time; (2) number of consecutive slots of each sub-resource in a set of periodic resources and/or a pattern; (3) time and/or frequency resource between one sub-resource (e.g. a transmission resource) and a subsequent related resource (e.g. a retransmission resource, a HARQ transmission resource, a CQI feedback resource, etc.); (4) an offset (e.g., in frequency) related to a reference PRB and/or an indicated PRB; and (5) a frequency hopping pattern.

According to embodiments, the information associated with QoS-related properties associated with resources may information associated with any of priority, reliability, or minimum range requirements for the data that will be transmitted on such resources. According to embodiments, the SCI may contain a PQI/PFI or an identifier related to the PQI/PFI. For example, the SCI may include information indicating a (e.g., full) QoS profile associated with a bearer. According to embodiments, a WTRU performing resource reservation consider resources reserved by another WTRU when it receives any of multiple or indefinite reservation SCI, if the CBR is below a specific threshold. The CBR threshold may be sent in the SCI that is performing the multiple/indefinite resource reservation.

According to embodiments, a WTRU may determine a periodicity for transmitting a periodic reservation signal. According to embodiments, the periodicity of (e.g., for transmitting) a periodic reservation according to any of: (1) a network configuration; (2) a measured CBR; (3) a WTRU's (e.g., its own) sensing window, and/or (e.g., in combination with) information associated with other WTRU's sensing windows (e.g., a time period over which another WTRU accumulates sensing results); and (4) a QoS property (e.g. reliability) associated with flow(s) and/or bearer(s) which may be mapped (e.g., in order) to use reserved resources. According to embodiments, a WTRU may be configured (e.g., preconfigured) with a mapping, for example, a mapping of reservation signal periodicity to measured CBR. According to embodiments, a WTRU may determine the periodicity of the transmission of (e.g., for transmitting) the periodic reservation signal based on the mapping.

According to embodiments, a WTRU may be configured with a mapping of reservation signal periodicity to reliability level (e.g. derived from PQI/PFI) of a highest and/or lowest reliability flow that may be transmitted over (e.g., using) resources reserved by the periodic reservation signal and the WTRU may determine the periodicity for transmitting the (e.g., periodic) reservation signal based on the mapping.

According to embodiments, a WTRU may transmit a reservation signal using broadcast mechanisms (e.g., unicast and/or multicast). According to embodiments, a WTRU may use a dedicated PHY channel associated with broadcast transmissions. According to embodiments, a WTRU may not use unicast and/or multicast aspects (e.g., mechanisms). For example, a WTRU may not use unicast and/or multicast aspects such as reference signal transmissions, HARQ feedback, etc. when transmitting a reservation signal. According to embodiments, a WTRU may be configured to transmit a reservation signal with additional robustness, for example, as compared to other broadcast transmissions. According to embodiments a WTRU may be configured to transmit a reservation signal according to any of: (1) utilizing (e.g., using) any of a larger transmit power, more conservative MCS, etc.; (2) by ensuring a reservation signal is not transmitted with other control and/or data (e.g., information) in a same slot (e.g., not in a same TDM slot with other transmissions); (3) utilizing (e.g., using) a larger number of repetitions; and (4) utilizing (e.g., using) duplication on multiple carriers.

According to embodiments, a reservation of periodic resources may be cancelled according to any of conditions or events. According to embodiments, a WTRU may cancel a resource reservation that was previously reserved. According to embodiments, a WTRU may cancel (e.g., may be triggered to cancel) a resource reservation according to any of the following events: (1) a WTRU determines that any of a sidelink radio bearer or logical channel (e.g., which may have certain QoS properties) should be cancelled or removed; (2) a WTRU determines that any of a unicast link or a multicast link should be torn-down, removed, or terminated, etc.; (3) a WTRU receives indication to cancel a resource reservation from upper layers; (4) A WTRU determines that upper layers are no longer generating periodic traffic (e.g., traffic having certain properties associated with periodic transmission); and (5) a WTRU determines that its distance to/from another WTRU is larger than the MCR associated with a sidelink radio bearer.

According to embodiments, an amount of periodic resources may be determined, for example, by a WTRU. For example, the amount of periodic resources determined to be reserved may be the amount of resources to reserve for each period of the periodic resource reservation.

According to embodiments, a WTRU may determine any of a size, period, or pattern of a periodic resource reservation based on information associated with any of the following: (1) a channel bandwidth; (2) a WTRU capability; (3) a CBR, for example, a measured CBR of a current channel; (4) a number of any of: carriers, BWPs, or similar; (5) a NW configuration; (6) QoS characteristics of the data to be transmitted, for example, any of a logical channel, a PQI/PFI associated with data, etc.; and (7) a number of QoS flows which are active, and/or a number of QoS flows having a same or related PQI/PFIs.

According to embodiments, with respect to NW configuration information, a WTRU may be configured with any of a default or WTRU specific configuration for resource reservation that may be used for creation of a radio bearer (e.g., configuration information indicating an amount of resources, periodicity of pattern of the resources, etc.). In a case where a WTRU determines a need for a radio bearer, for example, based on an establishment of a unicast link, the WTRU may initiate a resource reservation for the needed resources. According to embodiments, a WTRU may be configured with information associated with: (1) any of a minimum or maximum amount of resources; and/or (2) a resource reservation pattern to be applied for data associated with any of a (e.g., specific) logical channel, logical channel type, or PQI/PFI. According to embodiments, a WTRU may reserve resources based on the information associated with (1) and/or (2) when the WTRU receives data for such PQI/PFI, or when the WTRU establishes a logical channel associated with such PQI/PFI. According to embodiments, a WTRU may determine an amount of periodic resources for a sidelink radio bearer based on a number of QoS flows which are multiplexed to a same QoS bearer.

According to embodiments, a WTRU may be configured with a maximum amount of resources to be reserved per period for data associated with a (e.g., specific) PQI/PFI. According to embodiments, a WTRU may determine a maximum amount of resources based on measured properties of a sidelink channel, such as a CBR. According to embodiments, a WTRU may receive data associated with a PQI/PFI (e.g., the specific PQI/PFI) and may perform resource reservation, for example, upon reception of the data associated with the specific PQI/PFI. According to embodiments, a WTRU may transmit a message (e.g. a single message, such as an SCI or similar) to reserve resources for a finite period of time. According to embodiments, a WTRU may use the resources reserved for the finite period of time for any of: any number of QoS flows or radio bearers, or data associated with a (e.g., particular) PQI/PFI. However, the present disclosure is not limited thereto, and, according to embodiments, a WTRU may transmit any number of SCIs (e.g., may transmit an SCI in each transmit period) to indicate that a WTRU is keeping (e.g., maintaining, re-reserving) the resources associated with an initial resource reservation.

According to embodiments, a WTRU may be configured with one or more resource patterns. According to embodiments, any one or more of the resource patterns may be reserved, for example, by (e.g., via) the reservation signal. According to embodiments, any one or more of the resource patterns may be associated with one or more QoS aspects for (e.g., of, associated with, etc.) any number of bearers using any of the resources or the current utilization of the pool (e.g., CBR). According to embodiments, a WTRU may select the associated resource pattern, for example, based on a CBR and/or a QoS of a bearer and/or a link being established. According to embodiments, a WTRU may be configured with rules for selecting a pattern. That is, according to embodiments, a WTRU may be configured with pattern selection rules for selecting another (e.g., a different) configured pattern. For example, a WTRU may select a pattern of reserved resources in a case where the reserved resources may be (e.g., are) used to transmit data associated with bearers having different QoS aspects (e.g. different PQI/PFI).

According to embodiments, may exclude resources from resources the WTRU may use for resource selection. For example, a WTRU, upon reception of a reservation signal, may exclude resources reserved by the reservation signal from resources the WTRU may use for resource selection. According to embodiments a WTRU may be configured with behaviors with regards to (e.g., may be configured to have different behaviors according to) the availability of the excluded reserved resources (e.g. in determining available resources). For example, these behaviors may be different than behaviors associated with a forward booking signal of LTE mode 4 like operation. According to embodiments, a UE may be configured with (e.g., for) behavior related to any of: (1) rules defining when a WTRU receiving the reservation signal may utilize (e.g., use) the reserved resources; (2) rules for a WTRU initiating (e.g., rules that a WTRU uses to initiate) its own bearer and/or link establishment; and rules defining use of adjacent resources (e.g. in a same slot, same PRB but adjacent slots, same PRB but adjacent beams, etc.).

In the case of rules defining when a WTRU receiving a reservation signal may utilize the reserved resources, according to embodiments, a WTRU may apply a different RSRP threshold (e.g., applied to a received reservation signal) when determining whether a reserved resource may be selected for transmission by that UE for transmission. In such a case, according to embodiments, a WTRU a UE may (e.g., always) avoid selection of a resource associated with a reservation signal, for example, in a case where the reservation signal is associated with a QoS aspect (e.g. priority) which is some number of levels higher than a QoS aspect of data to be transmitted by the WTRU receiving the reservation signal. Further, in such a case, according to embodiments, a WTRU may (e.g., only) select resources reserved by a reservation signal following successful performance of a different channel access mechanism, for example, if the WTRU does any of: (1) (e.g., first) transmits a pre-emption signal; or (2) e.g. first) performs LBT on a resource and the resource is observed to be unused.

In the case of the rules with which a UE may initiate its own bearer and/or link establishment, according to embodiments, a WTRU may determine its own bearer admission decisions and/or unicast and/or multicast link establishment decisions based on any of: a number of received reservation signals, a total amount of resources reserved by the reservation signals, a received power of the received reservation signals, or other information provided in the reservation signal transmission (e.g. QoS information). In the case of the rules defining use of adjacent resources, according to embodiments, a WTRU may do any of: (1) exclude selection of adjacent resources for its own transmission; and (2) reduce transmission power on adjacent resources, for example, if such resources are selected.

Figure 2:
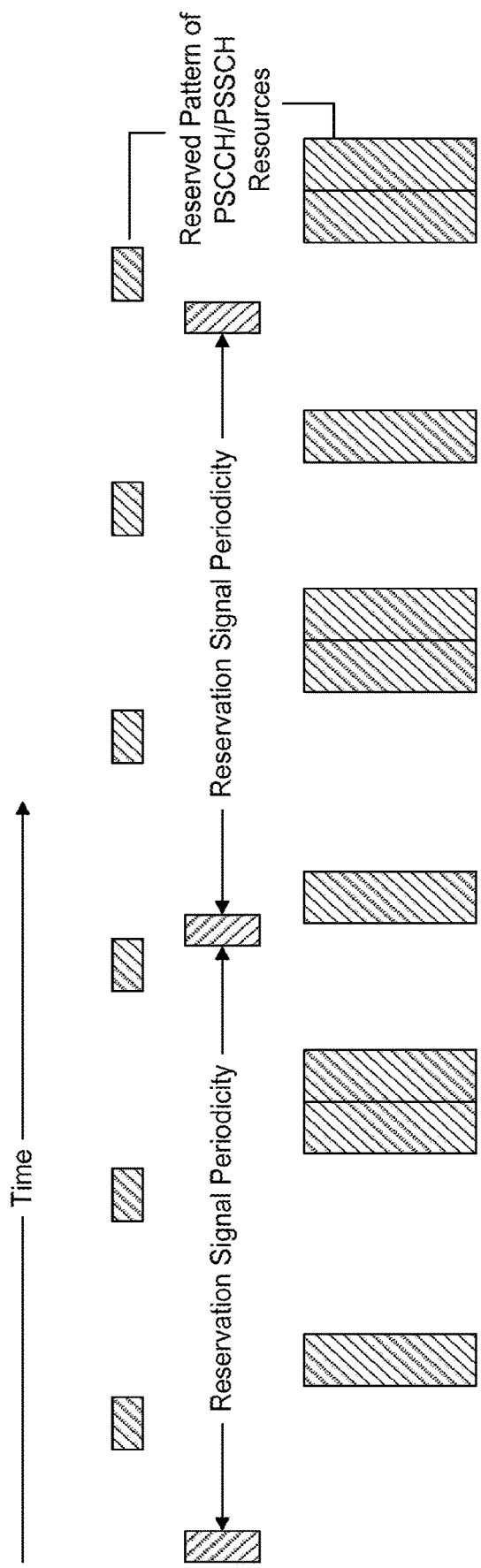
FIG. 2 is a diagram illustrating a reservation signal according to embodiments.

FIG. 2 is a diagram illustrating a reservation signal according to embodiments.

Referring to FIG. 2, a reservation signal and associated reserved resources are shown. According to embodiments, a WTRU may transmit a periodic reservation signal on a PSCCH (e.g. may transmit a SCI-like transmission). According to embodiments, a reservation signal may be transmitted with a selected periodicity which is unrelated to the data periodicity and may contain information associated with (e.g., all information necessary to indicate) the reserved resources on a PSSCH. According to embodiments, reserved resources on a PSCCH and/or PSSCH may consist of a predefined pattern of time/frequency resources indicated in a reservation signal. According to embodiments, a WTRU reserving resources (and/or a peer UE) may use reserved resources for any of a PSCCH and a PSSCH, and/or any of HARQ and/or CSI feedback transmission, etc.

According to embodiments, a WTRU may send a message to change properties of a reserved resource. For example, a WTRU may send an SCI-like message to change the properties of a reserved resource, such as a periodically reserved resource. According to embodiments, a WTRU may send an indication (e.g., a change indication) which changes a resource reservation that the WTRU had previously reserved. According to embodiments, an indication changing a resource reservation may be sent after receiving the signaling (e.g., after a finite, configured, determined, etc., amount of time after receiving the signaling) to reserve the resource for the subsequent period. According to embodiments, an indication changing a resource reservation may be sent prior to the occurrence of the resource that was previously reserved. According to embodiments, a WTRU may provide, for example, using information included in a change indication, an intention to change any of a nature, amount of resources, or timing of a reservation.

According to embodiments, a WTRU may indicate, for example, using information included in a change indication, any of: (1) a size of a resource (e.g. a number of subchannels) to be reserved may be increased or decreased; (2) a timing of a resource may be changed; (3) any number of beam on which a resource is transmitted may be changed; (4) QoS characteristics (e.g. any of priority or any QoS characteristic in PQI/PFI) associated with data to be transmitted on a resource may be changed; (5) any of adding or removing of any of a logical channel or a radio bearer on a sidelink; and (6) an upper layer adds and/or removes a flow, and/or a specific PQI/PFI associated with the flow.

According to embodiments, a WTRU may transmit a change indication using any of: (1) an SCI or similar message, for example, on a PSCCH, (2) a synchronization signal; (3) a transmission of broadcast data, for example, on a physical sidelink shared channel (PSSCH); and (4) a reference signal (e.g. a DMRS) at a designated time/frequency location. According to embodiments, a time/frequency location of a transmitted reference signal may represent (e.g., indicate) any of the information discussed with respect to the contents of the change indication.

According to embodiments, contents of a change indication may include a variety of information, any of which may be indicated by a time/frequency location of a transmitted reference signal.

According to embodiments, a WTRU may transmit a change indication including any of the following information: (1) priority of the data; (2) reference to any of a process or a reserved resource which the WTRU is intending to change; (3) a nature of a change; (4) any of a time offset or a beam offset of a (e.g., newly) reserved resource, or any of a time, frequency, or beam location of a new resource; (5) a size of the new resource reservation, or change of the resource reservation size by indicating an increase (in number of resource blocks, subchannels, etc.) or decreased relative to the original reservation; (6) a periodicity of a new resource reservation; (7) a number of reservation periods for which the change should take effect; and (8) any number of sub-resources in a periodic set of reserved resources that may not be used by a WTRU and/or may be modified with respect to any of time, frequency, an resource size.

According to embodiments, a WTRU may reference any of a process or a reserved resource by including a value of any of a process number, a bearer ID number, a QoS flow ID number, or similar, in a change indication. According to embodiments, a WTRU may set such value to be the same as a corresponding value in the original SCI which had previously reserved the resource being changed. According to embodiments, a WTRU may reference any of a process or a reserved resource by including any of a time, frequency, or beam location of a resource being changed, and/or any of a time, frequency, or beam of the SCI which originally reserved the resource. According to embodiments, such location may be identified by the WTRU by sending an offset to any of the time, frequency, or beam of the change indication itself.

According to embodiments, a WTRU may indicate the nature of a change (e.g., what is being changed) in a reserved resource. For example, a WTRU may indicate any of: (1) a size of a reserved resource is being increased/decreased; (2) a number of beams in a reserved resource is being increased/decreased; (3) a QoS parameter (e.g. a PQI/PFI or any value/information derived from a PQI/PFI) associated with a reserved resource is being changed; and (4) a periodicity of the resources being changed. According to embodiments, a WTRU may indicate an offset in any of symbols or slots of the new offset relative to its previous reserved location. According to embodiments, a change indication may indicate that the resources reserved may be fewer than the initial reservation for a number of periods (e.g., the next x periods), and may further indicate that a size of the resource reservation will then return to the initial reservation size following such time (e.g., the time of the number of periods).

According to embodiments, there may be any of triggers, events, or actions for sending a change indication. According to embodiments, a WTRU may send a change indication in response to any of the following events: (1) a WTRU receives an indication from upper layers that a packet size has changed; (2) a WTRU determines a change in a best beam for transmission to a destination WTRU. For example, the WTRU may send the indication in response to the change in time for reception of any of a synchronization or reference signal from another WTRU, (3) a WTRU determines conditions related to a buffer size (e.g., for a particular logical channel). For example, a WTRU may send an indication if a buffer size for a logical channel exceeds a threshold; (4) a sidelink radio bearer is established or torn down; and (5) a change in a CBR or similar measure of channel conditions.

According to embodiments, transmission of the change indication may be conditioned on sensing results. For example, transmission of a change indication following one of the above discussed triggers may be conditioned on the results of a sensing procedure. According to embodiments, a WTRU may initiate a sensing procedure (e.g., at the lower layers) upon occurrence of one of the above discussed triggers. According to embodiments, a WTRU may determine whether a sensing procedure (e.g., the sensing procedure following the trigger) is needed based on a type of change indication being sent. For example, a WTRU may determine that a change indication requires reservation of additional resources, and may trigger a sensing procedure for the additional resources. As another example, for a change indication which reduces a size of a current resource allocation, a WTRU may determine to not trigger a sensing procedure.

According to embodiments, a WTRU may initiate transmission of the change indication. For example, in case where the sensing procedure indicates that part or all of the new resources are available, a WTRU may initiate transmission of a change indication. According to embodiments, a WTRU may change any of a size or nature of a change indication based on sensing results. On the other hand, according to embodiments, a WTRU may initiate a resource reselection procedure following a sensing procedure. For example, in a case where sensing results indicate new resources to be occupied (e.g., by higher priority WTRU transmissions), a WTRU may initiate a resource reselection procedure.

According to embodiments, in the case of a change indication resulting in an increase in the resource size, a WTRU may perform a sensing operation on a subset of resources. For example, a WTRU may perform sensing only on subchannels which are adjacent to an existing resource reservation (e.g., to be able to perform transmission of contiguous subchannels). In a case where such resources are deemed unavailable, a WTRU may perform a full resource reselection procedure, for example, rather than performing transmission of the change indication.

According to embodiments, a WTRU may make changes to a set of reserved resources. According to embodiments, a WTRU may transmit a reservation signal to modify a set of reserved resources. For example, in a case where a WTRU wants to (e.g., determines to) change a set of reserved resources, the WTRU may transmit a reservation signal including information associated with modified reserved resources (e.g., information indicating a change and/or modification of reserved resources). According to embodiments, in such a case, subsequent transmissions of the reservation signal may be according to a selected periodicity of the reservation period.

According to embodiments, a WTRU may receive a change indication. For example, a WTRU may change its behavior based on the received changed indication. According to embodiments, a WTRU performing sensing for its own resource reservation may consider reception of a change indication by modifying resulting available/occupied resources based on the change indication. According to embodiments, a WTRU may further consider a latest change indication to be the most valid.

According to embodiments, a WTRU may receive a change indication and may determine or modify the availability/occupancy of a resource by any of: (1) determining an original resource to which the change indication refers to; (2) obtaining an occupancy of an original resource based on an SCI or similar message which initially reserved the original resource; or (3) modifying the associated information in the SCI by applying the change indicated in the change indication.

According to embodiments, a WTRU may operate according to the change indication, for example, at a certain time, transmission, frame, condition, etc. According to embodiments, a WTRU may consider (e.g., determine) a change indication to take effect at (e.g., until) a next transmission of a periodic reservation signal. For example, in such a case, upon (e.g., after) transmission of the next reservation signal, the change reflected by the change indication may be ignored by the WTRU. According to embodiments, a change indication may (e.g., only) be considered on (e.g., applied to) a subset of resources (e.g., resources indicated explicitly and/or implicitly in the change indication itself). According to embodiments, a change indication may take effect indefinitely (e.g., may take precedence over (and/or may be applied to) future transmissions of the periodic reservation signal). According to embodiments, a WTRU may accumulate all received change indications associated with a specific instance of a reservation signal to determine the reserved resources at any instant in time.

Figure 3:
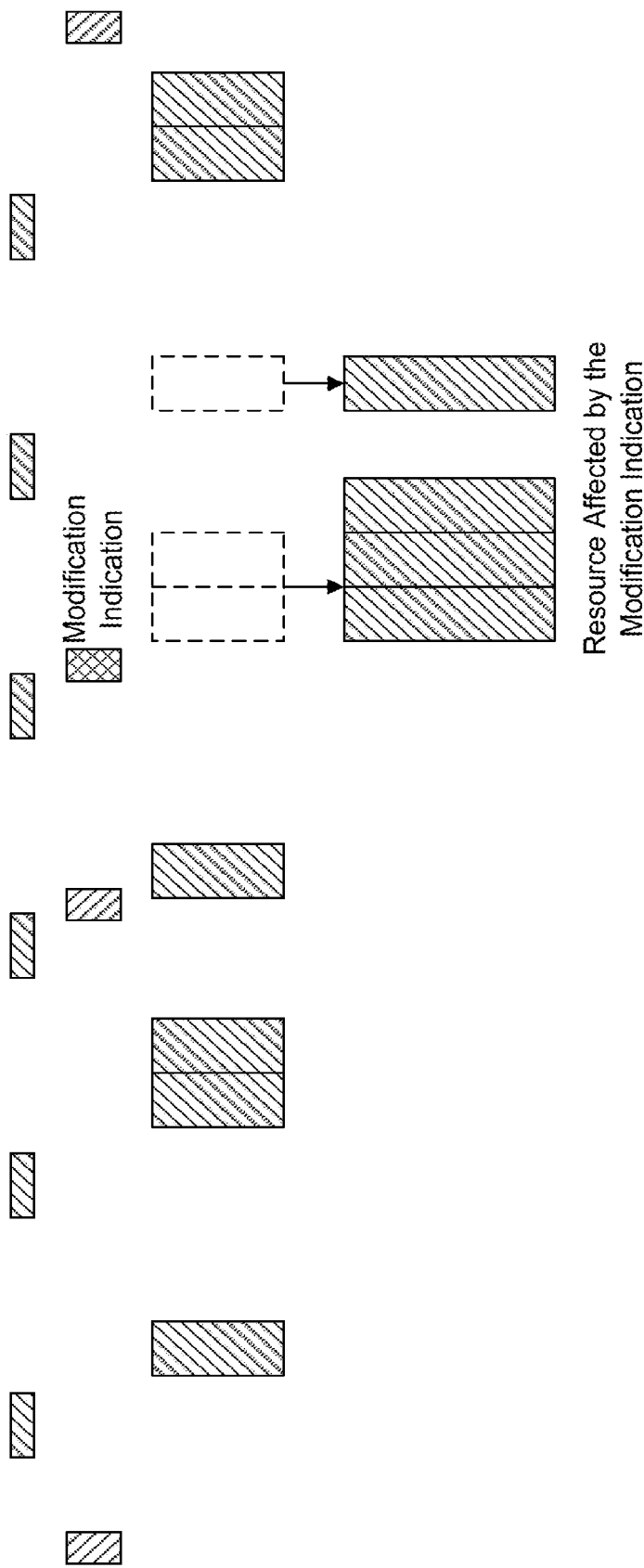
FIG. 3 is a diagram illustrating a change indication signal according to embodiments.

FIG. 3 is a diagram illustrating a change indication signal according to embodiments.

Referring to FIG. 3, a change indication (which may be interchangeably referred to as a modification indication) is show. According to embodiments, a reservation signal may be transmitted periodically to reserve a pattern of resources. According to embodiments, a change indication (e.g., a modification indication) may be transmitted to change PRBs (e.g., an amount and/or frequency location of PRBs) of a subset of the resources in a pattern. According to embodiments, such modification may (e.g., only) affect a subset of the resources. According to embodiments, such modification may contain (e.g., include information associated with) any of: an identification of sub-resources to be affected, a PRB offset of a new location of the resources, and an increase (e.g., in time and/or frequency) of modified sub-resources.

According to embodiments, a WTRU may reserve periodic resources based on a number (e.g., a certain maximum number) of resources the WTRU may need (e.g., require) each period. According to embodiments, a WTRU may determine such maximum value based on a configured size to be used for an associated PQI/PFI. According to embodiments, a WTRU may initiate transmission of an initial resource reservation at any of: the reception of data associated with the PQI/PFI, indication from the upper layers, or creation of any of a flow or radio bearer. According to embodiments, a WTRU may transmit a change indication associated with an initial resource reservation when the WTRU determines that a packet size associated with a type of periodic traffic has decreased (e.g., for a finite duration of time). According to embodiments, a WTRU may receive information related to a packet size from upper layers and may initiate transmission of a change indication to indicate a reduction of a size of a resource reservation. According to embodiments, a change indication may indicate that the reduction of the size of the resource reservation may take effect for an amount of time (e.g., for x periods), and may further indicate that the size of the resource reservation may change or return to the original size following the indicated amount of time.

According to embodiments, a WTRU may determine that a packet or transmission in an upcoming periodic set of transmissions may be skipped. For example, a WTRU may determine that transmissions may be skipped based on information provided by upper layers. According to embodiments, a WTRU may determine that a packet or transmission in an upcoming periodic set of transmissions may be skipped based on a decision (e.g., by upper layers) to drop a packet. According to embodiments, a WTRU may determine that an upcoming periodic packet or transmission may be skipped based on a change in a CBR, or similar environmental conditions, as measured by a WTRU. According to embodiments, a WTRU may transmit a change indication to indicate the non-usage of a single instance of a periodic resource reservation.

Figure 4:
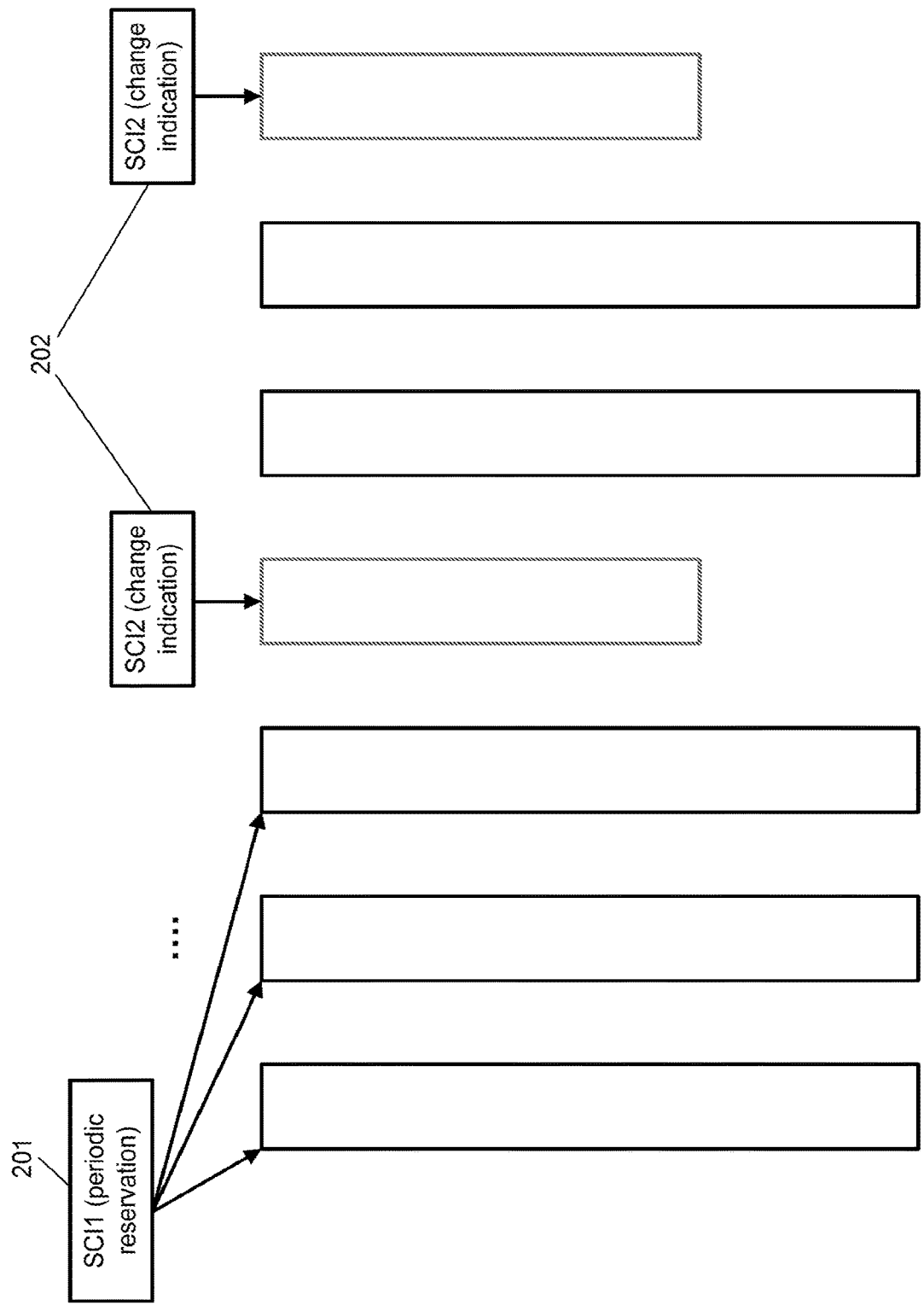
FIG. 4 is a diagram illustrating resource reservation for long term usage of resources according to embodiments.

FIG. 4 is a diagram illustrating resource reservation for long term usage of resources according to embodiments.

Referring to FIG. 4, a WTRU may transmit a reservation message 201 to reserve periodic resources. The reservation message 201 may be performed using an indefinite resource reservation described herein. That is, according to embodiments, a WTRU may periodically transmit the reservation message 201 (e.g., an SCI) indicating any of the time, frequency, or beam resources of the full resource reservation. According to embodiments, a WTRU may transmit a change indication 202. For example, after transmitting the resource reservation message 201 (e.g., after resource reservation), a WTRU may transmit (e.g., at any instance of the occurrence of the periodic resource) a change indication 202 indicating that the number of resources associated with the periodic resource reservation is changed for that specific period. According to embodiments, a change indication 202 may include information indicating and/or referring to an identifier associated with the full periodic reservation.

Resource Reservation for Data Rate Requirements

According to embodiments, a WTRU may be configured with any number of services, and each service may have respective (e.g., specific) rate requirements. According to embodiments, a WTRU may support any number of services and may determine that one or more services it supports has certain rate requirements. According to embodiments, a WTRU may receive an indication (e.g., from upper layers): (1) that a service has been configured or initiated, and (2) of rate requirements for the service. According to embodiments, a WTRU may receive an associated PQI/PFI (e.g., or rate requirement) of the service that has been configured or initiated by the WTRU. On the other hand, according to embodiments, a WTRU may be configured with a set of destination addresses related to a service having specific rate requirements. For example, a WTRU may be configured with a mapping of destination addresses to any of PQI/PFIs or required rates.

According to embodiments, a WTRU may calculate rate requirements. For example, a WTRU may calculate its (e.g., overall) rate requirements. According to embodiments, a WTRU may compute its overall rate requirements based on the number of services configured and/or activated at the WTRU, may determine which of the services have specific rate requirements, and may determine a (e.g., specific) rate requirement of each service configured and/or activated at the WTRU. For example, a WTRU may determine a PQI/PFI, associated with a service, that indicates a rate requirement.

According to embodiments, a WTRU may determine its total rate requirement using any of the following information: (1) a total number of QoS flows created by upper layers and/or activated at the WTRU; (2) a PQI/PFI associated with each QoS flow; (3) a mapping of PQI/PFI to data rate (e.g., which may be configured by upper layers) by the network, or preconfigured at the WTRU; (4) a total number of sidelink radio bearers created by the WTRU at a specific time; (5) a data rate associated with each sidelink radio bearer created by the WTRU; and (6) a data rate associated with or configured with a destination address configured at the WTRU as an interested destination address.

According to embodiments, a WTRUE may determine its overall rate requirements based on the number of active QoS flows created by upper layers (e.g. NAS layer or application layer). According to embodiments, a WTRU may dynamically update an overall rate requirement, for example, in a case where upper layers add or remove QoS flows. According to embodiments, a WTRU may determine respective rate requirements associated with each QoS flow based on (1) any of the PQI/PFI or similar QoS parameter associated with each QoS flow, and (2) QoS profile information which maps a PQI/PFI to a (e.g., maximum) data rate. According to embodiments, QoS profile information may be any of: provided by the network (e.g. in RRC configuration), provided by upper layers, or preconfigured in the WTRU. For example, a WTRU may sum up the rate requirements of each of the active QoS flows to determine the overall rate requirement at the WTRU.

According to embodiments, a WTRU may calculate its overall rate requirements based on the number of sidelink radio bearers created. According to embodiments, each sidelink radio bearer may be associated with a maximum data rate and the WTRU may sum the data rates associated with each radio bearer to determine the overall rate requirements of the WTRU.

According to embodiments, a set of resources may be configured based on data rate requirements. For example, a WTRU may configure, or may be configured with, a set of resources for resource selection based on data rate requirements.

According to embodiments, a WTRU may determine a set of resources for resource selection (e.g., any of a sidelink transmission BWP, a transmission BW, number of carriers to use, or similar) based on data rate requirements of one or any number of the WTRU's services. For example, a WTRU may use the number of any of: configured QoS flows, sidelink radio bearers, or the overall rate requirement (whose calculation is described herein). According to embodiments, a WTRU such a number to perform any of: (1) select a number of carriers; (2) select a number of BWPs (e.g., across the different carriers); (3) select a BWP for operation on a given carrier, the overall BW of which may be determined by the value of the overall rate requirement; and (4) increase or decrease the number of BWPs and/or carriers which are currently active at the WTRU.

According to embodiments, in the case of mode 3 resource selection, a WTRU may be configured with a BWP, or similar, for operation based on similar calculation or determination of the overall rate requirements. According to embodiments, in a case where a WTRU is configured with a BWP or similar for transmission, the WTRU may perform resource selection for transmission (e.g., only) on the configured BWP.

According to embodiments, rate requirements for mode 3 scheduling may be reported to a network. According to embodiments, a WTRU may report rate requirements or a change in rate requirements to a network. For example, the WTRU may send such report via any of an radio resource control (RRC) message or a media access control (MAC) control element (CE). According to embodiments, a WTRU may report overall rate requirements to a network when a WTRU (e.g., initially) connects to a network, for example, to request V2X services (e.g., via a SidelinkUEInformation RRC message or similar). According to embodiments, a WTRU may derive such information to be reported based on any of the active destination addresses, number of services configured, QoS profile configured in the upper layers, or similar.

According to embodiments, a WTRU may report a number of QoS flows active at the WTRU at a given time or may report a change in the number of QoS flows. According to embodiments, a WTRU may choose to operate a (e.g., certain) number of radio bearers using mode 3, and may choose to operate a remainder of the (e.g., certain) number of radio bearers using mode 4. According to embodiments, a WTRU may report any of the number of radio bearers, QoS flows, or similar, which the WTRU requests to have served by mode 3 type operation, and a WTRU may report the identification of each of the radio bearers which will be served by each mode. According to embodiments, such reporting may allow the network to (e.g., properly) configure the resources (e.g. the BWP, the number of sidelink radio bearers, etc.) for mode 3 operation.

Figure 5:
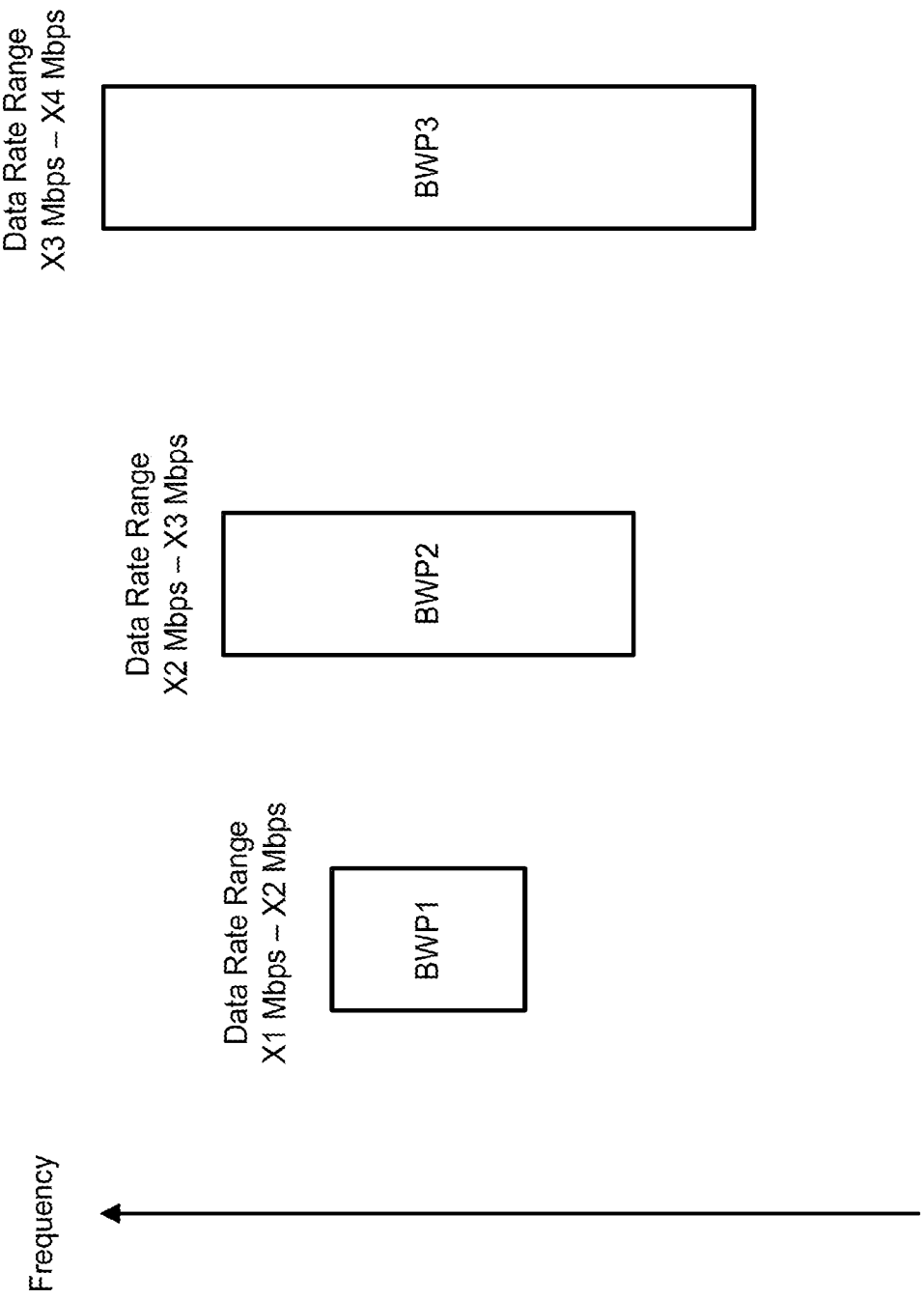
FIG. 5 is a diagram illustrating selecting of any of BWPs or carriers according to embodiments.

FIG. 5 is a diagram illustrating selecting of any of BWPs or carriers according to embodiments.

According to embodiments, any of BWPs or carriers may be selected based on rate requirements. According to embodiments, a WTRU may determine its transmission BWP based on any of data rate requirements or information related to data rate requirements.

Referring to FIG. 5, a WTRU may be configured with a rule for selecting from among any number of any of sidelink transmission BWPs or sidelink carriers or a combination of such, based on computed data rate requirements or a similar measurement. According to embodiments, a WTRU may be configured with a number of candidate BWPs for operation, and each BWP may be associated with a range of rate requirements (e.g. a range could be in the form: 50 MBps to 100 MBps, and/or may be in the form of a range of number of QoS flows, or a number of radio bearers). According to embodiments, a WTRU may select its current active BWP based on the current calculation of the data rate requirement. According to embodiments, a WTRU may change its current active BWP based on a change in the data rate requirement, for example, which may occur during operation due to any of: (1) addition/removal of QoS flows by upper layers, (2) addition/removal of radio bearers configured at the WTRU, or (3) the change of data rate requirements associated with one or more QoS flows or sidelink radio bearers.

According to embodiments, a WTRU may be configured with a (e.g., specific) BWP to be used for a (e.g., specific) destination address. For example, in a case where data is received for a specific destination address, or in a case where a radio bearer is created for a specific destination address, a WTRU may select resources and may transmit data destined to the specific destination address on an associated BWP. According to embodiments, a WTRU may be configured with a number of BWPs to be used for any of unicast or multicast transmissions. For example, a WTRU may activate a BWP upon creation of any of a multicast or unicast link, and may associate such link with a specific BWP.

According to embodiments, there may be a dedicated BWP for any number of radio bearers. According to embodiments, a WTRU may be configured to use a dedicated (e.g., additional) BWP for one or more radio bearers. For example, upon creation of a sidelink radio bearer, a WTRU may initiate transmission on a new BWP. According to embodiments, a WTRU may perform transmission of data associated only with the created sidelink radio bearer(s) on the new BWP. According to embodiments, a WTRU may restrict data multiplexing (e.g. multiplexing of SDUs associated with different radio bearers), for example, so that radio bearers associated with different sidelink BWPs are not multiplexed together. According to embodiments, a WTRU may transmit a BWP initiation message to inform other WTRUs of the initiation of transmission on a BWP. According to embodiments, a BWP initiation message may have similar contents and form as the BWP change message described herein.

According to embodiments, a BWP may be indicated during unicast or multicast link setup. According to embodiments, a WTRU may select a BWP to use for a specific unicast or multicast transmission during link setup (e.g., during or using a link setup procedure, signaling, or communication) with another WTRU. According to embodiments, two or more WTRUs may initiate a link setup procedure for creating a unicast or multicast link between the two or more WTRUs or for creating a radio bearer. According to embodiments, such link setup procedure may include exchanging RRC messages between the WTRUs, for example, to configure (e.g., determine, setup, etc.) the resources to be used for the unicast link (e.g., the BWP, carrier, etc.) between the WTRUs. According to embodiments, the BWP and/or carriers may be negotiated by the WTRUs, for example, based on exchange of the WTRU's capabilities during the unicast or multicast link establishment.

According to embodiments, a BWP change message may be transmitted or received by a WTRU. For example, in a case where a WTRU changes its transmission BWP, the WTRU may transmit a BWP change message over the sidelink to inform other WTRUs of the change in the reception BWP. According to embodiments, a WTRU may transmit a BWP change message when the WTRU is configured with one or more sidelink unicast or multicast links. According to embodiments, a BWP change message may take any of the following forms: (1) an SCI message transmitted on the original BWP; (2) an SCI message transmitted on the new BWP; (3) an SCI message transmitted at specific (e.g., predefined) times (e.g. on BWP switch slots) to allow other WTRUs to periodically monitor such slots; (4) an RRC message transmitted from one WTRU to another WTRU, and (5) an RRC message or MAC CE transmitted to the network, for example, which can then be forwarded by the network to other WTRUs.

According to embodiments, a BWP change message may contain (e.g., information indicating) any of the following: (1) an identification of a BWP to be activated; (2) an identification of a BWP to be changed; (3) destination address(es) and/or a receiving WTRU for which the BWP change should apply; and (4) an identifier of the unicast or multicast link to which the BWP change applies. According to embodiments, a WTRU that receives a BWP change message may perform any of the following: (1) change the BWP for reception of V2X messages; (2) change a reception pool to the reception pool associated with the new BWP; (3) select one of a number of configured reception BWPs allowing the WTRU to receive data; and (4) determine that a change in the reception BWP is not needed. For example, the WTRU may determine that the reception BWP is not needed, either because the BWP change message is not intended for that WTRU, or the WTRU is already configured to receive on the new BWP.

Dynamic Resource Determination

According to embodiments, separate resource pools may be configured for unicast and/or multicast. For example, separate resource pools configured for unicast and/or multicast compared may be preferred to (e.g., over) resource pools configured for broadcast to allow more efficient admission control and monitoring for bearers and/or links. However, separate resource pools may be inefficient for out-of-coverage UEs or IDLE mode UEs where the network is not aware of the number of UEs having ongoing unicast/multicast links.

According to embodiments, different resources (e.g. a pool configuration) for different types of sidelink communication may be used according to implicit and/or explicit information (e.g., rules, measurements, etc.) associated with a number of WTRUs operating with a type of cast (e.g., unicast, groupcast, etc.). According to embodiments, such resources (e.g., a pool configuration) may be determined dynamically. For example, a WTRU may determine available resources (e.g. a pool configuration) for different types of sidelink communication based on implicit and/or explicit information associated with (e.g., concerning) the number of WTRUs operating with that certain type of cast. According to embodiments, a pool configuration for a (e.g., particular) WTRU operating in unicast may be determined according to any of: (1) a number of WTRUs operating in unicast (e.g., WTRUs operating in unicast in a same area); and (2) unicast traffic associated by such (e.g., associated with) WTRUs. For example, dynamic pool determination may be beneficial for ensuring efficient resource usage for out-of coverage operation and/or IDLE mode in-coverage operation, while allowing separate pool configuration for unicast and/or multicast.

According to embodiments, resources may be configured according to an occurrence of a condition. That is, according to embodiments, a WTRU may be configured with (e.g., provided) resources based on (e.g., according to) the occurrence of one or more conditions. According to embodiments, a WTRU may be configured with different pools or different pool sets. According to embodiments, in a case where a WTRU is configured with different pools and/or pool sets, each pool and/or pool set may be associated with use of any number of unicast transmissions by the WTRU. According to embodiments, in a case where a WTRU is configured with different pools, a pool set may consist of any of: any number of pools to use for unicast transmission, any number of pools to use for broadcast, and any number of pools to use for broadcast. According to embodiments, a WTRU may determine a (e.g., which) pool to use for unicast transmission and/or a (e.g., which) pool set is applicable (e.g., available) for any of unicast, multicast, or broadcast transmissions according to conditions (e.g., as discussed herein).

According to embodiments, a WTRU may be configured with: (1) a single pool; and (2) rules for determining a percentage of a pool and/or specific resources within a pool that are usable for unicast and/or groupcast transmissions. According to embodiments, the percentage and/or rules may be determined according to (e.g., any number of) conditions (e.g., as discussed herein). For example, a WTRU may be configured to reserve every other slot (e.g., time domain) or every other PRB (e.g., frequency domain) of a resource pool for any of unicast and/or groupcast transmission for an allocation (e.g., half, 50%) of the pool to unicast and/or groupcast transmission.

According to embodiments, a WTRU may determine a resource configuration according to a (e.g., measured) CBR. According to embodiments, a WTRU may determine a (e.g., which) resource configuration (e.g., to use) according to its own measure of CBR for one of the pools (e.g., of the resource configuration). For example, a WTRU may measure a CBR on one of the pools associated with broadcast, and according to the measured CBR, may determine a (e.g., the actual) pool configuration to use for any of broadcast, unicast, or multicast transmission. According to embodiments, a WTRU may determine a resource configuration according to sensing results associated with a pool.

According to embodiments, a WTRU may determine a (e.g., which) resource configuration to use according to (e.g., based on) sensing results, for example, including any of: measurements of SCI, reservation signals, or similar signals transmitted on a PSCCH. According to embodiments, such sensing results may be performed on any number of (e.g., the configured) pools. According to embodiments, such results may indicate (e.g., a presence of) unicast transmissions. According to embodiments, a WTRU may determine a number of (e.g., distinct) unicast transmissions according to sensing results performed on all configured pools. According to embodiments, a WTRU may determine a (e.g., the actual) pool(s) to use for unicast transmissions based on the number of distinct unicast transmissions. According to embodiments, a WTRU a WTRU may use QoS requirements of (e.g., all) detected unicast transmissions to determine a pool (e.g., to use for transmission). According to embodiments, a WTRU may consider a PQI/PFI associated with each detected unicast transmission to determine a pool. For example, according to embodiments, a WTRU may determine a pool according to according to the PQI/PFI(s) (e.g. the cumulative QoS requirements of all established unicast links).

According to embodiments, a WTRU may determine a resource configuration according to broadcast transmission of another WTRU. According to embodiments, a WTRU may determine a resource configuration according to a transmission based on (e.g., of) such configuration by another WTRU. According to embodiments, a WTRU may be a resource configuration sync source for another WTRU. According to embodiments, in a case where the WTRU is a resource configuration sync, the WTRU may transmit a required resource configuration for (e.g., to be used by) other WTRUs. According to embodiments, a WTRU that is a resource configuration sync source may determine the required resource configuration according to any of the methods described herein (e.g. sensing, CBR measurements). According to embodiments, for example, following such determination, a WTRU that is a resource configuration sync source may (e.g., periodically) broadcast the resource configuration to other UEs using any of the following: (1) a SL-BCH channel (e.g. using SL-MIB); (2) a PSCCH transmitted in a broadcast pool; and (3) a PSSCH message (e.g. an RRC-like message) transmitted in a broadcast pool.

According to embodiments, a WTRU may determine a validity area of a system information block (SIB), for example a V2X SIB, according to any of a location (e.g., a geolocation) or a cell ID. According to embodiments, a WTRU may receive a pool configuration (e.g., a pool configuration for any of V2X communications or sidelink communications) via (e.g., from) a SIB, such as, for example, an area specific SIB that is associated with a location (e.g., a geolocation, a validity area, etc.) of the WTRU. According to embodiments, a validity area of an area specific SIB including a resource pool configuration may be (e.g., the same as) another geolocation. For example, a WTRU may determine, based on the WTRU's location, that the validity area of an (e.g., V2X) area specific SIB that includes its resource pool configuration may be the same as another location.

According to embodiments, a WTRU may be configured with any number of and/or a set of any of zones or geographical areas. According to embodiments a WTRU may be configured (e.g., a WTRU may be provided with a configuration), for example, with a SIB of any cell within a zone, area, location, etc. According to embodiments, a WTRU may further associate an (e.g., V2X) area specific SIB received from any cell in a zone (e.g., area, location, etc.) to be valid for (e.g. any) another cell the WTRU camps on within that zone. According to embodiments, a WTRU may (e.g., then) perform SIB1 reception (e.g., for determining an area ID, and potentially new validity geographical area or zone) when the WTRU moves outside its previously configured area or zone.

According to embodiments, a list of cell IDs may be associated with a common pool configuration. For example, according to embodiments a WTRU may be configured a list of cell IDs for which the WTRU may assume (e.g., may determine, identify, etc.) a common pool configuration and/or a common (e.g., V2X) area specific SIB. According to embodiments, in a case where a WTRU decides to reselect to another cell, the WTRU may determine whether an (e.g., V2X) area specific SIB is still valid, for example, based on whether the cell ID of the target cell is included in the list of cell IDs. According to embodiments, the WTRU may receive such a cell list (e.g., list of cell IDs) via any of a SIB or pre-configuration. For example, an advantage of the above discussed features may be that a WTRU in RRC_IDLE may (e.g., be allowed to) continue mode 2 V2X communication on a pool configured to be common between two cells before the WTRU reads the system information of the neighbor cell (e.g., in order to determine a pool configuration).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method, performed by a wireless transmit/receive unit (WTRU), the method comprising:
    determining a resource configuration that comprises information indicating one or more of a size of a resource reservation signal (RRS), a period of the RRS, or a pattern of the RRS;
    determining one or more available sidelink resources for transmission of periodic data via a sidelink radio bearer; and
    transmitting the RRS according to the determined resource configuration, the RRS comprising reservation information associated with the determined one or more available sidelink resources.

2. The method of claim 1, wherein the resource configuration is determined based on one or more of a channel busy ratio (CBR), one or more quality of service (QoS) characteristics of the periodic data to be transmitted, one or more active QoS flows, or one or more QoS flows having the same or related PC5 QoS identifiers (PQIs) or packet flow identifiers (PFIs).

3. The method of claim 1, wherein the reservation information comprises information indicating a period of a resource reservation for the periodic data, and
    wherein the period of the resource reservation for the periodic data is determined based on one or more of a channel bandwidth, a WTRU capability, a channel busy ratio (CBR), a number of carriers or bandwidth parts (BWPs), a sensing window, a network (NW) configuration, one or more quality of service (QoS) characteristics of the periodic data to be transmitted, a number of QoS flows which are active, or a number of QoS flows having one or more of the same or related PC5 QoS identifiers (PQIs) or packet flow identifiers (PFIs).

4. The method of claim 3, wherein the sensing window is the WTRU's sensing window or another WTRU's sensing window,
    wherein the CBR is a measured CBR, and
    wherein the one or more QoS characteristics are associated with a flow or a bearer mapped to the reserved resources.

5. The method of claim 1, wherein the WTRU is configured with information indicating one or more patterns of a resource reservation, and
wherein each of the one or more patterns is respectively associated with a quality of service (QoS) aspect of a bearer according to one or more resources or a current channel busy ratio (CBR).

6. The method of claim 1, wherein the WTRU is configured with information indicating one or more rules for pattern selection.

7. The method of claim 1, further comprising transmitting, by the WTRU, the periodic data, comprising one or more of a physical sidelink shared channel (PSSCH), a physical sidelink control channel (PSCCH), hybrid automatic repeat request (HARQ) resources for HARQ transmissions by the WTRU or a peer WTRU, a channel state information (CSI) required for a unicast link or a multicast link, or a CSI that is feedback by the WTRU or a peer WTRU.

8. The method of claim 1, wherein the RRS further comprises one or more of a time, a frequency, one or more beam resources to be reserved, a periodicity of the reserved resource, a granularity of the reserved resources, or an index indicating a pattern of resources, and
wherein the pattern of resources is associated with one or more of a periodicity of resources in time, a number of consecutive slots of each sub-resource in a set of periodic resources or pattern, a time and frequency resource between one sub-resource and a subsequent/related sub-resource, an offset in frequency, or a frequency hopping pattern.

9. A wireless transmit/receive unit (WTRU) comprising a transmitter, a receiver, a processor and memory, configured to:
determine a resource configuration that comprises information indicating one or more of a size of a resource reservation signal (RRS), a period of the RRS, or a pattern of the RRS;
determine available sidelink resources for transmission of periodic data via a sidelink radio bearer; and
transmit the RRS according to the determined resource configuration, the RRS comprising reservation information associated with the determined one or more available sidelink resources.

10. The WTRU of claim 9, wherein the resource configuration is determined based one or more of a channel busy ratio (CBR), one or more quality of service (QoS) characteristics of the periodic data to be transmitted, a number of active QoS flows, or a number of QoS flows having the same or related PC5 QoS identifiers (PQIs) or packet flow identifiers (PFIs).

11. The WTRU of claim 9, wherein the reservation information comprises information indicating a period of a resource reservation for the periodic data, and
wherein the period of the resource reservation for the periodic data is determined based on one or more of a channel bandwidth, a WTRU capability, a channel busy ratio (CBR), a number of carriers or bandwidth parts (BWPs), a sensing window, a network (NW) configuration, one or more quality of service (QoS) characteristics of the periodic data to be transmitted, a number of QoS flows which are active, or a number of QoS flows having one or more of the same or related PC5 QoS identifiers (PQIs) or packet flow identifiers (PFIs).

12. The WTRU of claim 11, wherein the sensing window is the WTRU's sensing window or another WTRU's sensing window,
wherein the CBR is a measured CBR, and
wherein the one or more QoS characteristics are associated with a flow or a bearer mapped to the reserved resources.

13. The WTRU of claim 9, wherein the WTRU is configured with information indicating one or more patterns of a resource reservation, and
wherein each of the one or more patterns is respectively associated with a quality of service (QoS) aspect of a bearer according to one or more resources or a current channel busy ratio (CBR).

14. The WTRU of claim 9, wherein the WTRU is configured with information indicating one or more rules for pattern selection.

15. The WTRU of claim 9, further configured to transmit the periodic data, the periodic data comprising one or more of a physical sidelink shared channel (PSSCH), a physical sidelink control channel (PSCCH), hybrid automatic repeat request (HARQ) resources for HARQ transmissions by the WTRU or a peer WTRU, a channel state information (CSI) required for a unicast/multicast link, or a CSI feedback by the WTRU or a peer WTRU.

16. The WTRU of claim 9, wherein the RRS further comprises one or more of a time, a frequency, one or more beam resources to be reserved, a periodicity of the reserved resource, a granularity of the reserved resources, or an index indicating a pattern of resources,
wherein the pattern of resources is associated with one or more of a periodicity of resources in time, a number of consecutive slots of each sub-resource in a set of periodic resources or pattern, a time and frequency resource between one sub-resource and a subsequent/related sub-resource, an offset in frequency, or a frequency hopping pattern.

17. A method, performed by a wireless transmit/receive unit (WTRU), the method comprising:
receiving a system information block (SIB);
determining one or more sidelink resources available for transmission of periodic data via a sidelink radio bearer based on a validity area of the SIB; and
transmitting a message comprising a resource reservation associated with transmission of the periodic data by the WTRU.

18. The method of claim 17, wherein the WTRU is configured with one or more of a number of areas, zones, or locations, wherein the one or more areas, zones, or locations are associated with one or more validity areas of the SIB.

19. The method of claim 17, wherein one or more cell IDs are associated with the validity area of the SIB or one or more resource configurations.

20. The method of claim 17, further comprising determining a resource configuration based on one or more of a channel busy ratio (CBR), one or more quality of service (QoS) characteristics of the periodic data to be transmitted, one or more active QoS flows, or one or more QoS flows having the same or related PC5 QoS identifiers (PQIs) or packet flow identifiers (PFIs).

* * * * *